United States Patent [19]

Siebenga

[11] Patent Number: 5,211,345

[45] Date of Patent: May 18, 1993

[54] LARGE BALE HANDLING APPARATUS

[76] Inventor: Charles Siebenga, 211 Eighth St., Apt. #2, Belgrade, Mont. 59714

[21] Appl. No.: 557,128

[22] Filed: Jul. 23, 1990

Related U.S. Application Data

[63] Continuation of Ser. No. 166,656, Mar. 11, 1988, abandoned.

[51] Int. Cl.$^5$ .................. A01D 90/00; B02C 13/286
[52] U.S. Cl. .................. 241/101.7; 241/605; 414/24.5; 414/111; 414/789.2; 414/789.7; 414/551; 119/57.91
[58] Field of Search ............ 241/101 A, 101.7; 298/17.6; 414/24.5, 24.6, 789.2, 789.3, 789.7, 795.4, 111, 518, 551

[56] References Cited

U.S. PATENT DOCUMENTS

| | | | |
|---|---|---|---|
| 3,942,666 | 3/1976 | Pfremmer | 414/24.5 X |
| 4,042,140 | 8/1977 | McFarland | 414/24.5 |
| 4,050,598 | 9/1977 | Schurz | 414/551 X |
| 4,068,804 | 1/1978 | Butler et al. | 241/101.7 |
| 4,103,794 | 8/1978 | Shaw | 414/24.5 X |
| 4,259,034 | 3/1981 | Ward et al. | 414/24.6 |
| 4,449,672 | 5/1984 | Morlock et al. | 241/101.7 |
| 4,534,691 | 8/1985 | Miguel | 414/111 X |
| 4,568,028 | 2/1986 | Verseef et al. | 298/17.6 X |
| 4,619,570 | 10/1986 | Siebenga | 414/789.7 X |
| 4,952,111 | 8/1990 | Callahan | 414/789.7 X |

FOREIGN PATENT DOCUMENTS

| | | | |
|---|---|---|---|
| 2560488 | 9/1985 | France | 414/24.5 |
| WO/86/072-34 | 12/1986 | PCT Int'l Appl. | 414/24.5 |
| 2169581 | 7/1986 | United Kingdom | 414/24.6 |

*Primary Examiner*—Robert J. Spar
*Assistant Examiner*—Janice Krizek
*Attorney, Agent, or Firm*—Waters & Morse

[57] ABSTRACT

A system for handling bales of feed includes a freight trailer with a tongue that can be offset laterally to cause the trailer to follow a path to one side of the path of a tractor to permit a front-loading device on the trailer to engage bales of feed and raise them onto a load-carrying platform of the trailer. The platform is tiltable downward to the rear to induce sliding movement of loaded bales, and to release said bales in a vertical stack. The platform is provided with a device to grip the top bale of a stack and insert a lifting member under the stack to retrieve it for feeding operations. The platform is tiltable downward-forward to induce forward movement of the bales for release onto a bale shredder carried in part on the tongue of the trailer.

23 Claims, 8 Drawing Sheets

LARGE BALE HANDLING APPARATUS

CROSS REFERENCE TO RELATED APPLICATION

This is a continuation of application Ser. No. 166,656, filed Mar. 11, 1988, now abandoned.

BACKGROUND OF THE INVENTION

The present invention provides a loading-stacking-retrieving-feeding apparatus for loading bales of hay onto a trailer; and in the process of loading, forming a stack that can be subsequently unloaded at an accumulation point. This same apparatus is able to reload the stacks, and move them to different locations and restack them. The loader-stacker-retriever apparatus can be transformed into a retriever-feeder apparatus in a relatively short period of time. In this mode, it will reload the stacks and feed hay from the bales out to livestock evenly, or in bunches, onto the ground.

In harvesting crops such as hay, the current practice is to utilize mobile baling devices which collect the hay and form it into bales. The bales are discharged to the ground as they are formed. Wagons or trucks are then driven over the field, and the individual bales are loaded thereon for transportation to a place of storage or utilization.

While some bale wagons are still loaded and unloaded by hand, usually a lifting apparatus, such as a forklift truck, is utilized to lift the bales and to load them on the bale truck or wagon. When the bale wagon is completely loaded, the bale wagon and the forklift truck are driven to the desired place of storage. The forklift truck is then utilized to unload the bales and to stack them in the desired location. In some cases, the entire load is dumped and then the bales must be stacked. Not only do these methods require multiple workers and piecemeal unloading, they are inefficient and time consuming. In addition, a certain degree of skill is required on the part of the forklift driver to avoid bales falling from the bale wagon or entire bale stacks toppling if not stacked properly.

While a variety of complex accessory apparatus such as conveyors have been designed for loading bale wagons, none has been entirely satisfactory. In many cases, the loading apparatus is separate from the bale wagon and must be transported from bale to bale along with relocating the bale wagon. Much of this equipment is not only complex and expensive, it is single purpose and simply consumes storage space throughout most of the year.

The apparatus described in U.S. Pat. No. 4,619,570 is a machine that will load, stack and retrieve bales with one operator and one machine. This machine provides substantial savings over conventional methods but is somewhat difficult to operate, because the apparatus must be backed up to load the bales. This becomes even more difficult after the first bale is loaded, because that bale obstructs the view of the operator. Also, there is difficulty in mounting apparatus to trucks, due to the variation in different truck models produced. The apparatus cannot be easily removed from a truck so the truck can only be used for the sole purpose of moving and retrieving bales. This machine referred to cannot feed bales of hay, which can only be done by another apparatus or by manual labor.

Accordingly, there is a present need for a simple, inexpensive apparatus for loading, stacking, retrieving, and feeding bales, such as bales of hay. Such an apparatus should be easily connected and disconnected from a power source such as a tractor or truck so as not to interfere with the use of the vehicle, for other operations.

SUMMARY OF THE INVENTION

The present invention provides a bale loading-stacking-retrieving apparatus which is mounted on a trailer, and which can be transformed in a relatively short period of time into a retriever-feeder apparatus.

The apparatus includes a bale receiving platform having a front end and a rear end, including a means for pivotally mounting the platform on the frame of the trailer to permit the platform to be pivoted between a forwardly inclined position and a rearwardly vertical position. The pivot mounting location for this latter movement is at the rear end of the trailer frame; and on the platform, the pivot point is forward from the rear of the platform at a distance equal to the vertical distance the pivot is above ground level. This platform can also be forwardly pivoted by a pivot located relatively close to the front of the receiving platform and the front of the trailer frame. When this pivot is secured, and the rear pivot released, the platform can be pivoted forwardly from a low inclined position to approximately a forty-five degree inclined position. Power means, preferably one or more hydraulic cylinders, are utilized to pivot the platform between the inclined position and a rearwardly vertical position. The same power means also pivots the platform from the inclined position to the forty-five degree forwardly inclined position. Two or more fork members extend upwardly from the rear of the platform, and generally perpendicular to the platform.

A loading apparatus is pivotally mounted at the front of the receiving platform, and includes a structure extending from the front of the platform a distance equal to the distance the front end of the platform is from ground level. A fork is pivotable at the end of the structure between a perpendicular position and a position approximately one hundred twenty degrees to the structure. The structure is pivotable upwardly approximately ten degrees past parallel to the platform, and downward to an almost vertical position. Preferably, the same power means can accomplish the pivoting of the structure and the fork. The loading apparatus is easily disconnected by removing the pivot pins and disconnecting the hoses.

A tongue with a hitch is mounted on the trailer extending forward a distance long enough to clear a feeding apparatus, and allow clearance for the turning of the tractor. The tongue is pivotally mounted to the frame of the trailer, and allows the trailer to be offset to the side of a tractor a distance equal to the length of the bale, or to trail in-line with the tractor.

A grasping apparatus consists of a pair of members pivotally mounted on opposite sides of the platform toward the front, and extending above the level of the platform. The tops of the members extend forward past the front end of the platform a distance equal to the width of a bale. Power means, such as hydraulic cylinders, are utilized to pivot the grasping members inwardly to grip bales, and outwardly to a non-gripping position. The grasping members and power means are easily removed by dislodging connecting pins and pivot pins and disconnecting the hydraulic hoses.

A feeder platform is removably secured to the front of the frame of the trailer by a connecting means such as bolts, pins or the like, and rests on the tongue when it is in the in-line position. The platform extends forwardly a distance wide enough to allow a bale to set on the feeder platform without tipping the bale on its edges, and below the receiving platform a distance low enough to allow a bale sliding forwardly off the receiving platform to rotate ninety degrees and level on the feeder platform. A bale-transfer apparatus is mounted on the feeder platform. Bale pushing arms are pivotally mounted on the feeder platform just below the top surface of the feeder platform. The bale pushing arms extend above the feeder platform on both sides. In the lowered position of these arms, they are low enough to clear a bale sliding onto the feeder platform, and short enough to miss the grasping arms on the trailer. The pushing arms are connected rigidly to rotate together. The outer extremities of the arms are connected by a beam to which a flexible belt is secured. This belt is long enough to cover the end of the bale when the bale pushing arms start to push the bale. Cables are connected to the opposite end of the belt. These cables wrap around both ends of the feeder platform on a roller and two cable pulleys. From there they wrap around another cable pulley which is connected to the beam joining the ends of the pushing arms. Then the cables are connected to the end of the feeder platform. The power means pivots the pushing arms from the generally horizontal position to the generally vertical position. This movement also moves the bottom of the belt from one end of the feeder platform to the opposite end by the cables.

A pair of feeder arms are connected pivotally to the feeder platform opposite the end of the pushing arms. These extend upwardly above the feeder platform, and are solidly connected at the bottom by a member which also functions as a pivot. Power means are provided for pivoting the arms between a generally vertical position to a generally forty-five degree outwardly inclined position. A shredding drum is rotatably mounted between the ends of the feeder arms. This drum lies in a horizontal position between the feeder arms and will adjust between various heights above the feeder platform. Power means are provided to turn the drum around its axis.

DETAILED DESCRIPTION OF THE PREFERRED EMBODIMENT

Figure 1:
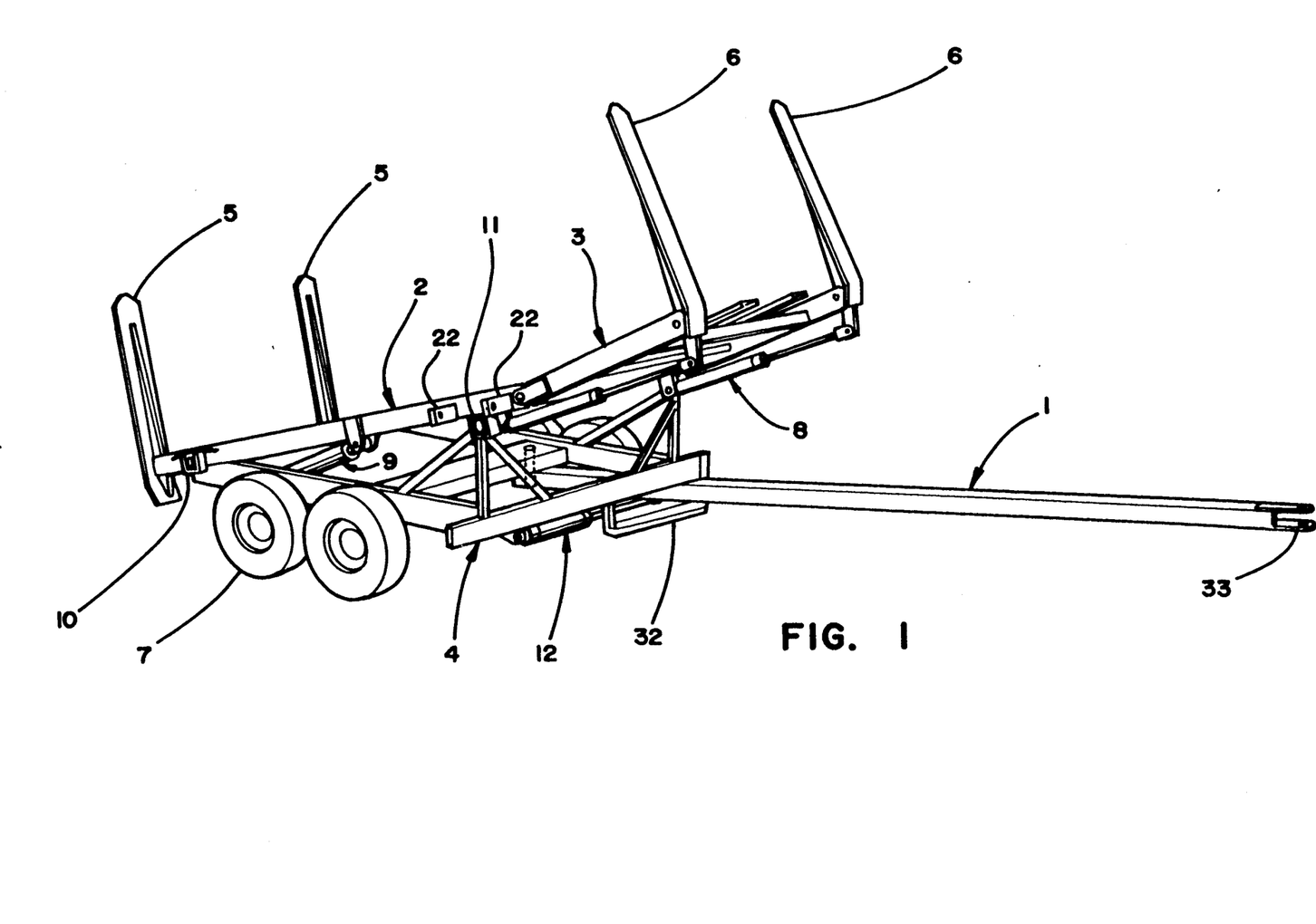
FIG. 1 is a front perspective view of the machine in the loading-stacking mode.

Referring to the drawings, the apparatus of the present invention is shown mounted on a special trailer. As shown in FIG. 1, bale-carrying platform 2 is shown pivotally mounted on the frame 4 of the trailer. Bale-loading apparatus 3 is pivotally mounted at the front of the platform 2, and a tongue 1 extends forward and to one side and is pivotally connected to the frame of the trailer.

Figure 2:
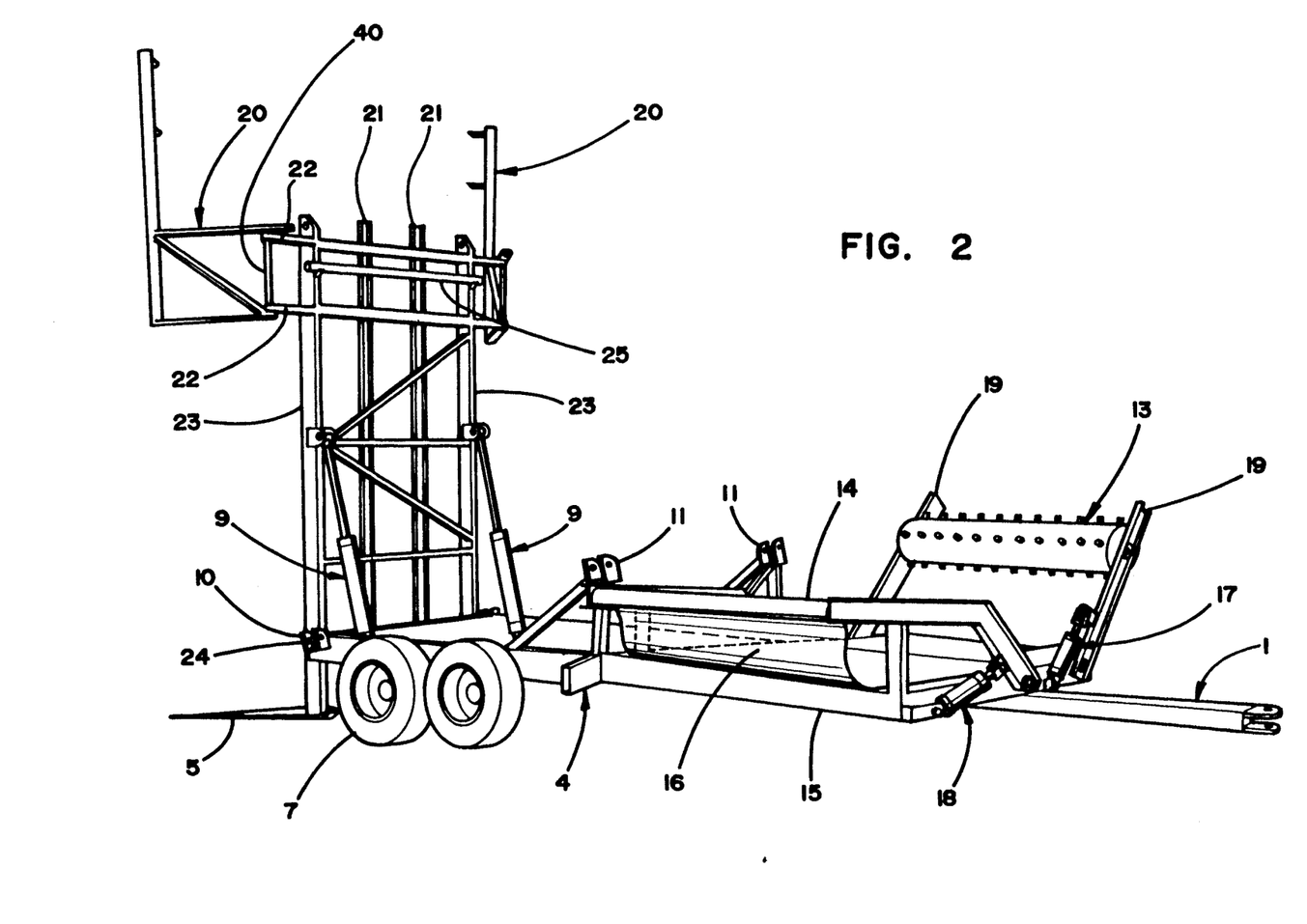
FIG. 2 is a front perspective view of the machine in the retrieving-feeding mode, with a bale grasping apparatus replacing the bale loading mechanism and the machine employing a bale feeder and shredding mechanism.

In FIG. 2, the invention is set up in its retrieving-feeding mode. To do this, bale loading apparatus 3 is removed and is replaced by a bale grasping apparatus, which comprises a pair of grasping arms 20 pivotally mounted towards the front of platform 2. The feeder platform 15 is mounted to the front of the frame 4 of the trailer, and rests on the tongue 1 when it is in the in-line position. Bale-pushing arms 14 are pivotally connected to the feeder platform 15. A belt 16 is connected to the beam 46 interconnecting the distal ends of the bale pushing arms. The feeding arms 19 are also connected pivotally to the feeder platform, and these carry the rotatable shredding drum 13.

Bale-receiving platform 2 is rectangular, and has two flat rails 21 for bales to slide on. These fit between the outside side frame members 23. Platform 2 is pivotally mounted to trailer frame 4 by means of rear fulcrum axle 24 and a front fulcrum axle 25 extending through platform members 23, and rear fulcrum receptacles 10 and front fulcrum receptacles 11. Rear receptacles 10 should be located near the end of trailer frame 4 and relatively close to the ground level. The rear pivot axle 24 is at a distance forward of the rear end of the platform 2 approximately equal to the height the rear receptacles 10 are from the ground, so that the rear end of platform 2 will be adjacent to the ground when in the vertical position such as shown in FIG. 2. The front fulcrum axle 25 is located on the platform 2 directly below the lower surface of platform 2, and a distance from the front end of platform 2 far enough to allow loader pivot 26 to clear front receptacle 11 while platform 2 pivots forwardly to an approximately forty-five degree position. The front receptacle 11 is mounted rigidly to the trailer frame 4. The location of the front receptacle 11 is near the front of the trailer frame 4, and is above the ground a distance approximately the width of a bale. The front and rear receptacles 11, 10 are directly to the outside of the platform outside members 23 on both sides of the platform 2. See FIG. 2.

While a variety of conventional power means can be employed for pivoting platform 2 between a rearwardly inclined position (FIG. 1) and a vertical position (FIG. 2), or a forwardly inclined position (FIG. 8), it is preferred to utilize hydraulic cylinders as a power means. Accordingly, as best shown in FIG. 2, the hydraulic cylinders 9 are mounted pivotally to load-carrying platform 2. The pivotal positions of the power means 9 can vary depending on the size of the power means and the linkages employed. The location of the power means 9 is preferred, and will position the platform 2 to all positions, even when the appropriate weight is applied. To pivot the platform 2 rearwardly, pins 37 and spacers 38 are placed in the rear receptacles 10, and cylinders 9 are extended to pivot bed upwardly and rearwardly to a generally vertical position, and then retracted to return platform 2 to the inclined FIG. 1 position. When pins 37 and spacers 38 are placed in the front receptacle, platform 2 pivots forwardly and upwardly when cylinders 9 are extended. The platform 2 will return to the inclined position (FIG. 1) when cylinders 9 are retracted.

Figure 3:
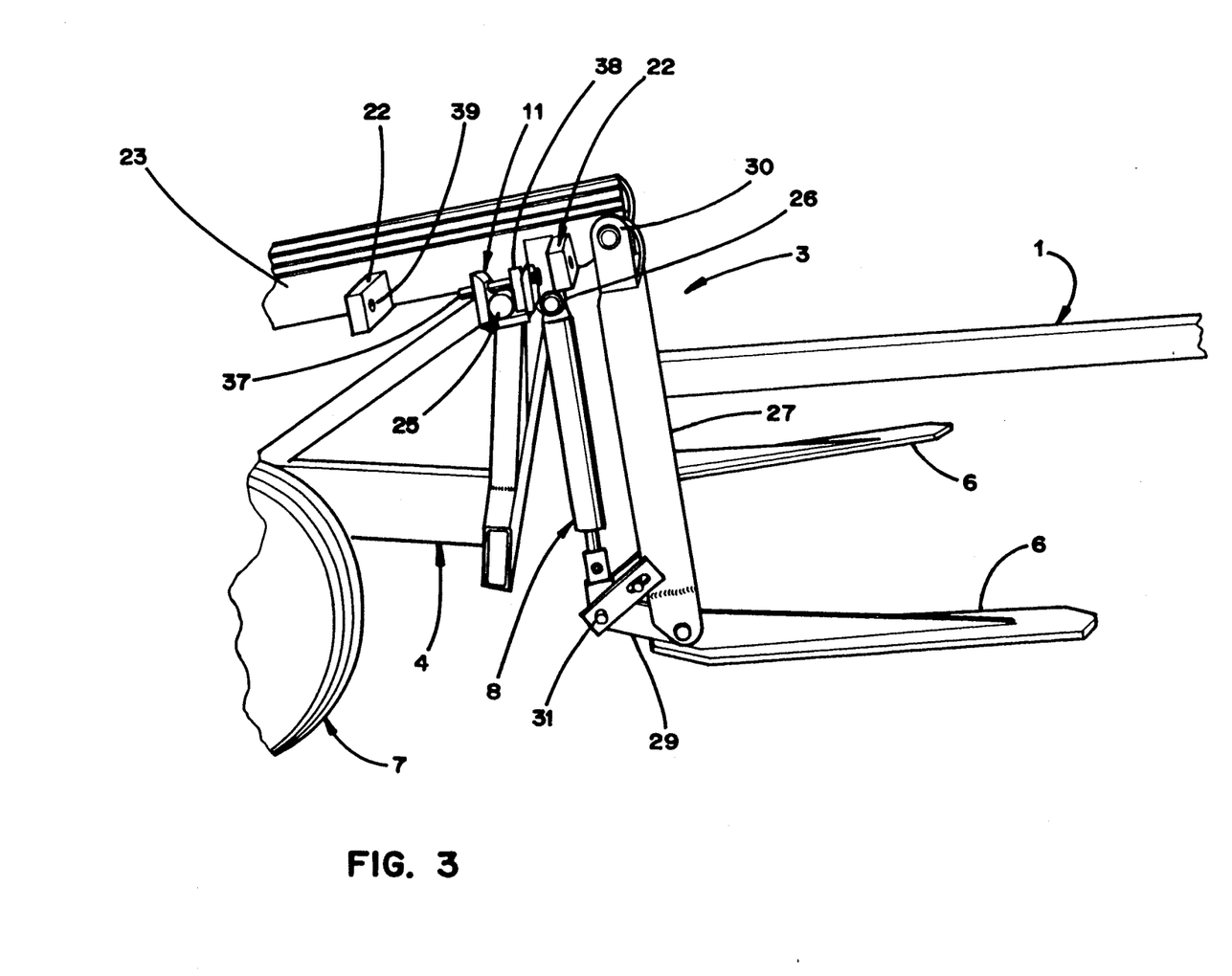
FIG. 3 is a fragmentary view of the loader of FIG. 1 on an enlarged scale.

As best shown in FIG. 3, bale loading apparatus 3 is mounted at the front of platform 2. This structure includes rigid arms 27 pivotally connected to platform 2 at 30 by a U-shaped fitting on the arm 27 and a projection on the platform side members 23. Pivot pins pass through corresponding holes in the U-shaped fittings and projection to provide a pivotable connection. While a variety of pivoting connections can be employed, this is an effective and simple design.

Loading forks 6 are pivotally mounted at the end of loading arms 27 by U-shaped ends on the loading arms 27 and projecting ends on loading fork 6. The fork 6 extends forwardly of the loading arm 27, a distance approximately equal to the height of a bale. The opposite end 29 extends rearwardly of loader arm 27 a distance long enough to attach hydraulic cylinder 8. While a variety of conventional power means can be employed for pivoting the loading apparatus, hydraulic cylinders pivotally mounted by connections 26, 31 close to the front and below platform 2, and pivotally connected to the rear end of fork 6, is effective and simple. A cylinder located in this position will pivot the fork first from ground level to a position perpendicular to the loading arm 27, and then raise the loader apparatus 3 to past parallel of platform 2 as shown in FIG. 1.

Figure 7:
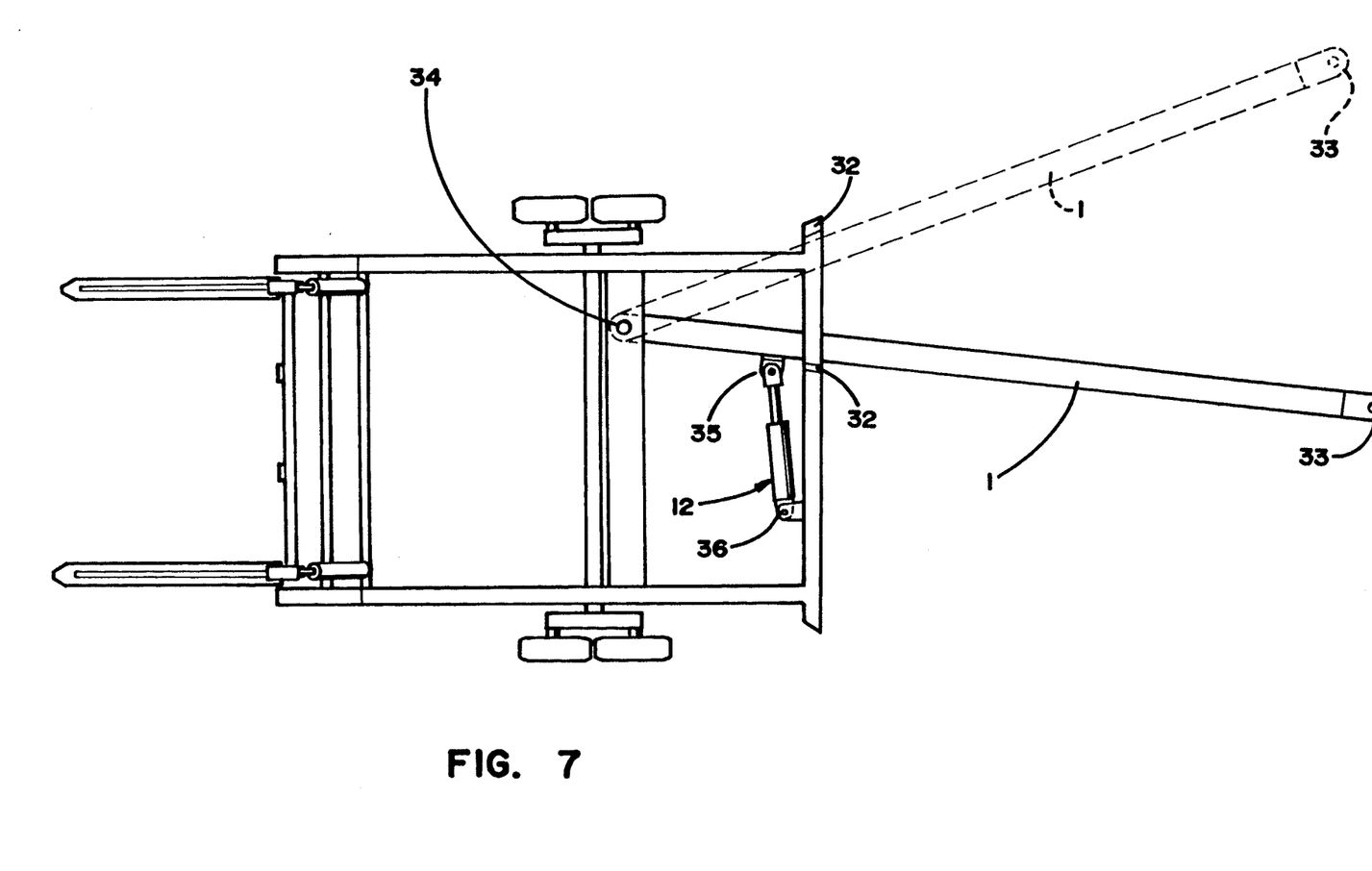
FIG. 7 is a plan view of the trailer frame and tongue.

The tongue 1 is located below the trailer frame 4 and extends forward a distance long enough to allow a tractor, or a truck functioning as a tractor, to clear the feeder platform in a sharp turn. The tongue 1 also extends rearwardly to the approximate center of trailer where it is pivotally connected at 34 (FIG. 7). The tongue 1 is held in position by the guide 32 and will pivot from a point where the tractor hitch 33 is in direct line with the center line of the trailer as shown in FIGS. 2 and 7 to a point off to the left of the trailer a distance where a bale would be in direct line of the trailer if the pulling unit were to pass right along side of the short end of a bale, as shown in FIGS. 1 and 7 (dotted line position). A hydraulic cylinder is connected pivotally to the tongue at 35, and to the frame of the trailer 4 at 36 to pivot about point 34.

Figure 4:
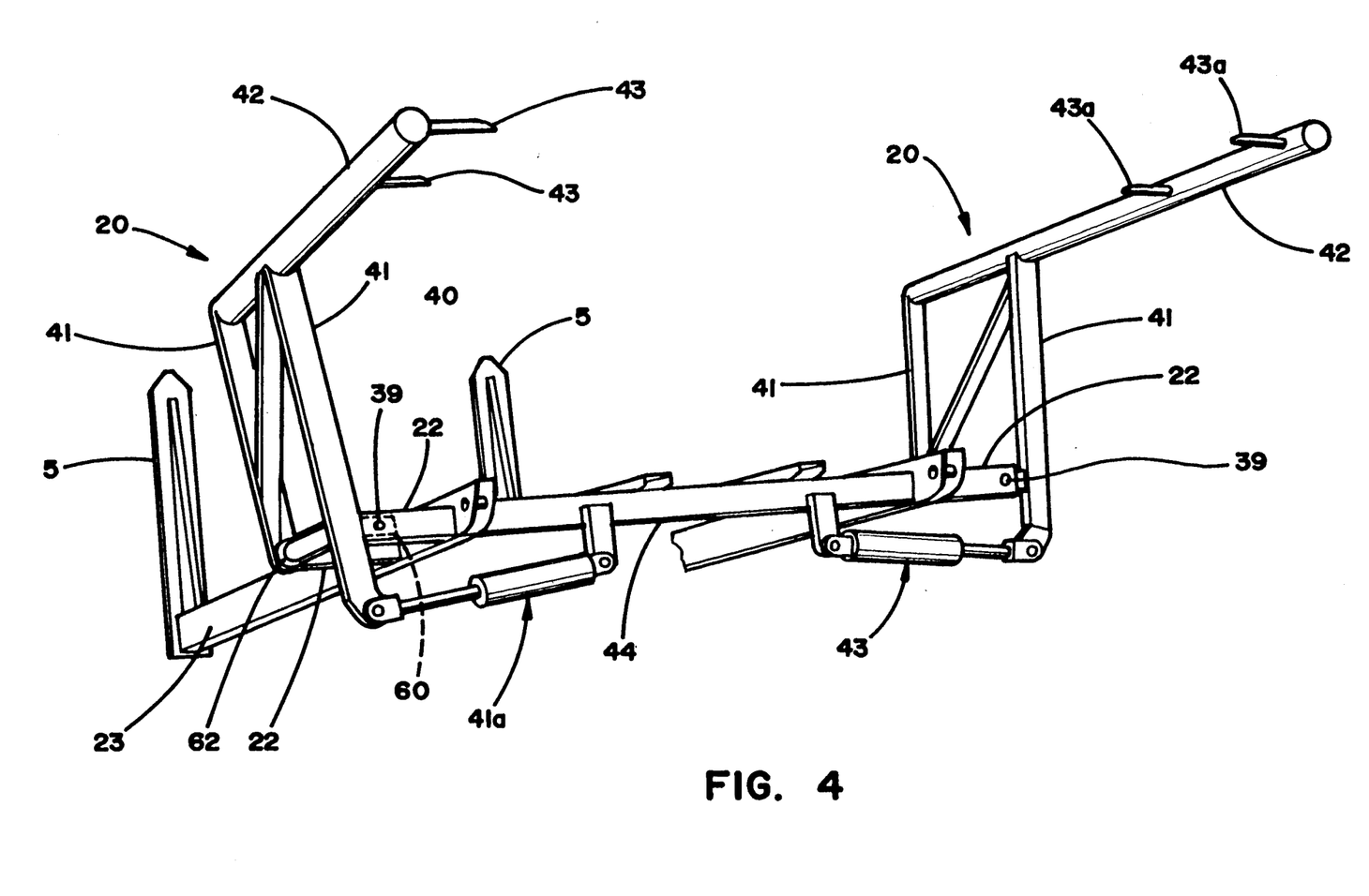
FIG. 4 is a perspective view of the bale-grasping apparatus of FIG. 2.

In order to assist in retrieving stacks of bales when the loading apparatus 3 is removed, a pair of grasping arms 20 are provided on the sides of platform 2 (see FIGS. 2, 4). The arms 20 are set apart approximately the length of a bale. Cantilever members 22 aid in making the correct separation between the arms, and have holes in the distal ends to secure and remove the arms. Projections 60 (shown in phantom) with holes therein fit inside the hollow connecting members 22 to secure the grasping arm 20 when a pin is passed through corresponding aperture 39 on the member 22. Connected rigidly to the ends of the projections 60 are bearing sleeves 62 through which the grasping arm pivot 40 passes. Connected rigidly to the ends of the pivot 40 are two uprights 41. The uprights extend upwardly approximately one-half to two-thirds the height of a bale. Cross members 42 are connected rigidly to the top of the uprights 41. These extend forwardly a distance approximately equal to the width of a bale. Two pins 43 are connected rigidly to the front of the cross members 42. These extend inwardly to engage the top bale of a stack. The forward upright extends below the platform 2 to pivotally engage the end of a power means, such as hydraulic cylinder 41a, which are pivotally mounted to the front platform cross member 44. When hydraulic cylinders 41a are extended, grasping arms 20 will pivot inwardly to grip bales on platform 2. When cylinders 41a are retracted, arms 20 will pivot outwardly to the non-gripping position. The arms are dependent on each other and must move inwardly together and outwardly together. This can be done by a number of means, such as mechanical linkages, but is preferably done by a master-slave cylinder set-up.

As shown in FIG. 2, the feeder platform 15 is mounted to the front frame cross member of the trailer frame 4. The feeder platform 15 rests on tongue 1, and is flat and rectangular in shape. The shape of the feeder is dependent on the bale being fed, and should be slightly larger than the bale. The feed platform 15 sets forward enough to allow bale pushing arms 14 to clear the front of platform 2 when in the inclined position as shown in FIG. 1. Also, the feed platform must set low enough to allow a bale sliding off platform 2 to rotate ninety degrees and lie flat on the feeder platform.

Figure 5:
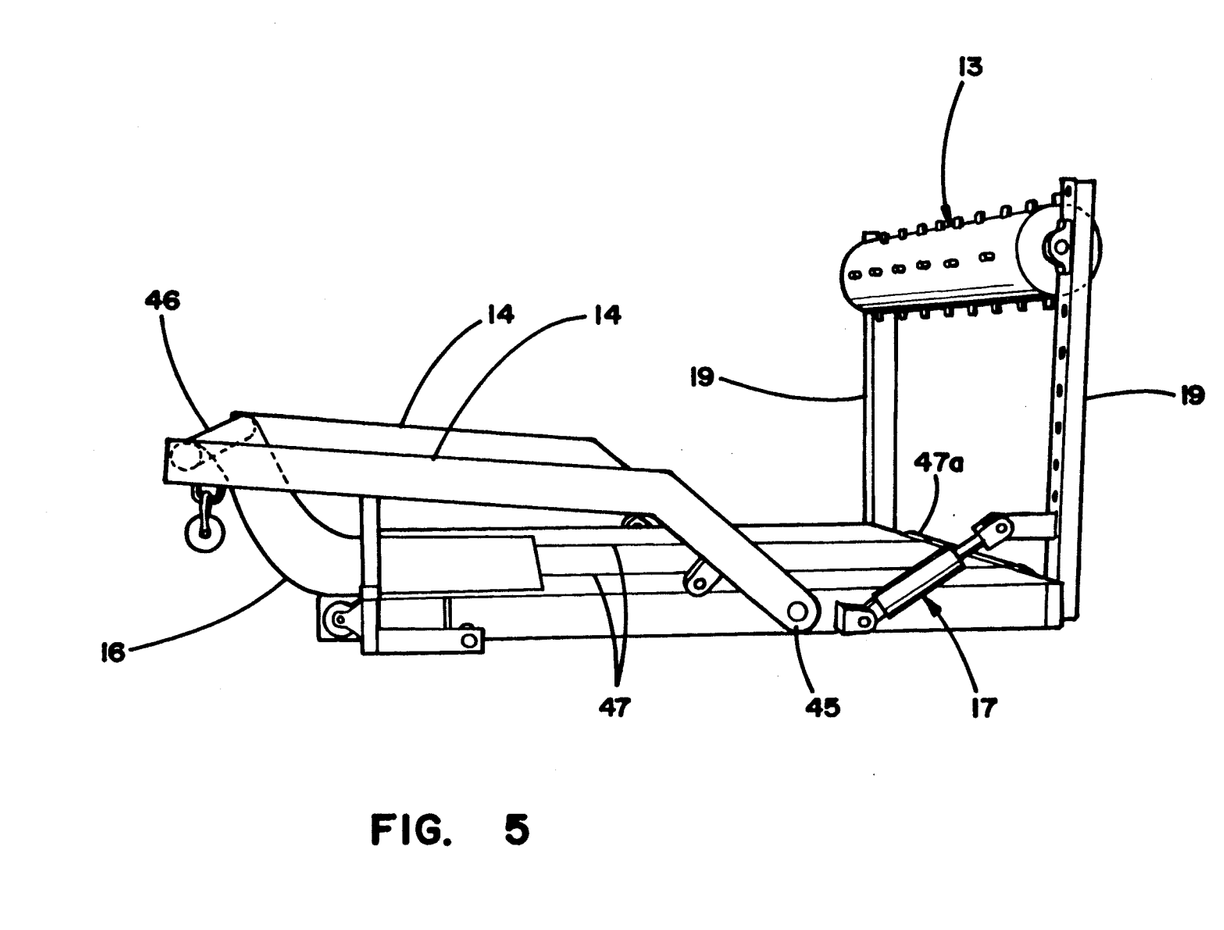
FIG. 5 is a perspective view of the feeder.

The bale pushing arms 14 are pivotally mounted at connections 45 below the platform, and off center towards the feeder arms 19. (See FIGS. 2, 5, and 6.) The pivoting ends of the pushing arms 14 are rigidly connected by a round tube 14a which passes through the sidewalls of the feeder platform. The distal ends of pushing arms 14 are rigidly connected by the beam 46 (see FIGS. 5 and 6). The belt 16 is connected to this beam. The belt extends the width of the platform, and approximately the length of the bale pushing arms 14. Two cables 47 are connected to the opposite end of the belt 16. These cables wrap around roller 47a mounted on tube 19a (see FIGS. 5 and 8), and extend along the bottom of the feeder platform 15, around cable pulleys 48, then around belt holding cable pulleys 49, and then connected to the feeder platform 15 at 50. Power means 51 are provided to pivot pushing arms from the generally horizontal position to the generally vertical position. Preferably, these are two hydraulic cylinders which can be the same hydraulic cylinders used on the loading apparatus 3. When the pushing arms 14 are rotated, this pulls on cable 47 and causes the bottom of belt 16 to move toward the feeder arms 19. The bottom of the belt 16 will move across the feeder platform 15 as pushing arms 14 are rotated from the horizontal to the vertical.

Figure 6:
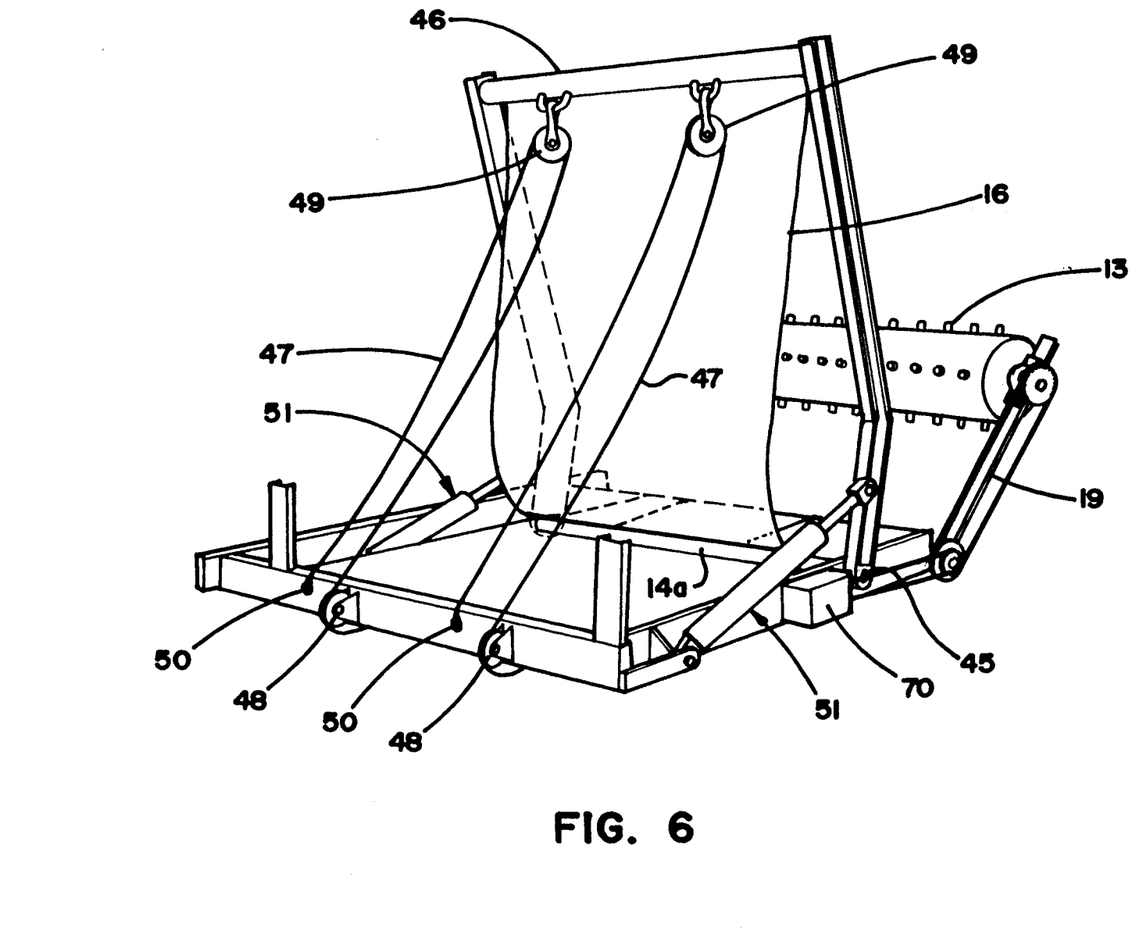
FIG. 6 is a perspective view of the feeder in elevated position.

Feeding arms 19 are pivotally connected to the ends of feeder platform 15. They are separated the width of the feeder platform 15 and extend upwardly a distance equal to the width of the bale being fed. The feeder arms are connected rigidly by a round tube 19a (see FIG. 8) at the pivotal end. A power means is provided, preferably a hydraulic cylinder 17 (see FIG. 5) to pivot the feeder arm between the generally vertical position (FIG. 5) and outwardly to a forty-five degree inclined position (FIG. 6). The shredding drum 13 is rotatably mounted between the feeder arms. The drum is round, and extends to almost the width of the platform, with protrusions on it for the purpose of grabbing pieces of bale. A power means 70 (shown schematically in FIG. 6) is provided, preferably from the PTO of the tractor or an orbit motor, to rotate the drum 13 around its axis.

Hydraulic cylinders 51, 43, 9, and 8 are powered and controlled by conventional means (not shown). For example, a conventional pump can be mounted on a tractor or truck with a connection to the engine. Hydraulic hoses are then utilized to connect the hydraulic cylinders to a control panel which is connected to the hydraulic pump. A remote control panel can then be located close to the driver of the tractor or truck so that the entire apparatus can be operated with the driver seated.

In use, a tractor is connected to the trailer via the hitch. Hydraulic hoses are also connected to power the cylinders. The tractor pulling the apparatus is driven to the site of the bales to be moved and stacked. The tongue is moved to the off-set position by extending the cylinder 12, and forks 6 are lowered to ground level. The tractor then drives forward along-side a particular bale until the bale is seated on forks 6. If for any reason it is desirable to have the bale in a different orientation prior to loading, the driver can lower the forks 6 to an intermediate position, and they will then function as a pusher member as the trailer is driven forward to rotate or tip the bale to the desired orientation. After a bale is seated on forks 6 hydraulic cylinders 8 are extended to rotate the loader and bale forward and up to platform 2. At this point, gravity will cause the bale to slide rearwardly onto platform 2 until that bale rests against forks 5. If the bale does not slide, platform hydraulic cylinders 9 can be extended to pivot platform 2 rearwardly to increase the angle of the platform 2 causing gravity to have more of an effect than friction. This procedure is repeated until platform 2 is full (the platform holds three bales). The final bale loaded on the forks 6 is held by the loading apparatus 3 in the up position as in FIG. 1. This entire loading procedure can be accomplished with a single operator remaining in the cab of the tractor or truck.

The tractor or truck pulling the apparatus is then driven to a central accumulation or storage area. The tractor then pushes the apparatus backward to the location desired to deposit the load, and hydraulic cylinders 9 are actuated to pivot platform 2 from the inclined position to the rearwardly vertical position for unloading. Hydraulic cylinders 8 are retracted to release pressure against the top bale, and the tractor then pulls the apparatus forward to remove forks 5 from under the stack. Platform 2 is then returned to the inclined position (FIG. 1), and the tractor and apparatus can then be returned to the field to pick up a new load. The unloading is thus also accomplished by a single operator without leaving the cab of the tractor or truck.

If it is desired to relocate a stack of bales, platform 2 is returned to the vertical position and forks 5 are pushed under a stack of bales by backing the apparatus up. When forks 5 are completely under the stack, hydraulic cylinders 8 are extended to push forks 6 down onto the top bale, thereby holding the stack to platform 2. Hydraulic cylinders 9 are then retracted to return platform 2 to the inclined position, with a complete load of bales for relocation.

This operation is also accomplished by a single operator without leaving the cab of the truck or tractor.

This completes the use of the apparatus as a loader, stacker and retriever. This apparatus can change into a retriever and feeder by removing the loader 3 and power means 8 and placing the grasping arms 20 and the feeding platform 15 onto the apparatus.

This apparatus is then connected to a tractor via the hitch, and the hydraulic hoses are connected. To retrieve a stack of bales, platform 2 is pivoted to the vertical position as shown in FIG. 2 by extending hydraulic cylinder 9. The apparatus is then pushed backwards until forks 5 are completely under a stack. Grasping arms 20 are then closed to the gripping position by hydraulic cylinders 43 with pins 43a holding the top bale.

Hydraulic cylinders 9 are then retracted to position platform 2 to the inclined position with a stack of bales. With the feeder arms and bale pushing arms in the outward position, grasping arms 20 are opened to the non-gripping position, which allows the top bale to rotate and fall onto the feeder platform 15. At this time, the operator would leave the tractor, and remove the binding means of the bale (like twine or wire). The operator would then remove the pins 37 and the spacers 38 from the rear fulcrum receptacle 10 to the front receptacle 11. The operator would then return to the tractor seat, and rotate the feeder arms 19 and bale pushing arms 14 inwardly with the shredding drum rotating to feed the bale out. The bale would be completely fed out when the pushing arms are in the generally vertical position. The operator can control the speed, density, and coarseness of the bale being fed by controlling the speed and height of the shredding drum 13, the speed of the bale pushing arm 14, and the forward speed of the tractor or truck.

Figure 8:
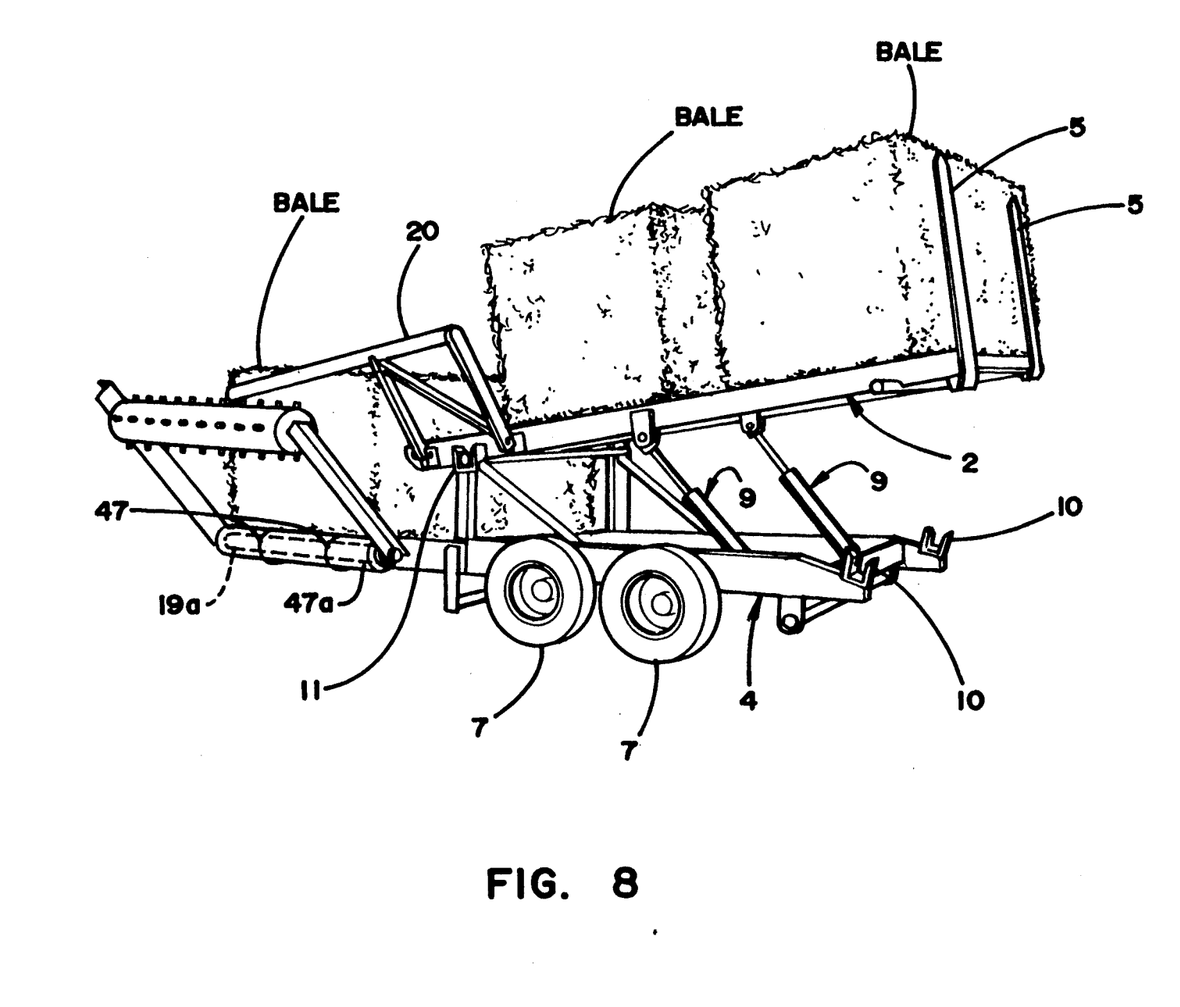
FIG. 8 is a perspective view showing the feeding operation.

After the bale is fed out, the pushing arms and feeder arms are returned to their generally outwardly position. Hydraulic cylinders 9 are extended to pivot platform 2 to the forwardly inclined position as shown in FIG. 8 to slide the bale forward onto the feeder, allowing them to rotate ninety degrees as they fall onto the feeder platform 15. After one bale is on the feeder platform, the hydraulic cylinders 9 are retracted to return platform 2 to the inclined position as shown in FIG. 1. The bale on the feeder platform is then fed out the same way the top bale was fed after the strings are removed. The same procedure is followed to feed all the remaining bales on the platform 2. After all the bales are fed out, the pin 37 and the spacer 39 are returned to the rear fulcrum receptacles so that platform 2 will rearwardly pivot to the vertical position to retrieve the next stack. Thus, the apparatus of the present invention is simple in construction, and easy and efficient to operate. It permits a single operator to completely load a bale wagon, deposit the entire load, and relocate the entire load without ever having to leave the cab of the tractor or truck. The apparatus is easily changed to make the present invention retrieve the entire load and feed out bales individually in various ways. Further, since the tractor or truck can have a variety of other uses throughout the season, the ease of connecting and disconnecting the present invention from the tractor or truck allows for complete freedom of use of the tractor or truck for a variety of other desired purposes.

While a preferred embodiment of the present invention has been described and illustrated, it will be obvious to those skilled in the art that various changes and modifications can be made without departing from the spirit of the present invention. For example, while fork means have been described as preferred for engaging the bales, a variety of other thin insert members, such as plates, can be utilized. While hydraulic cylinders are the preferred power means, motor driven gear or pulley systems, can be utilized. While the apparatus of invention has been shown mounted on the frame of a trailer, it can be mounted on virtually any type of wagon or other mobile means. Accordingly, the scope of the present invention is deemed to be limited only by the following claims.

The embodiments of the invention in which an exclusive property or privilege is claimed are defined as follows:

1. A feed dispenser including a bale-receiving platform and bale-shredding means, wherein the improvement comprises:
   pushing arm means pivotally mounted of said platform for movement about a horizontal axis;
   a beam secured to the distal end of said pushing arm means parallel to said axis;
   belt means secured at one end to said beam, the opposite end of said belt means extending to a position at least adjacent said platform when said pushing arm means is substantially vertical;
   flexible tension-transmitting means connected to said opposite end of said belt means;
   guide means establishing a path of movement for said tension-transmitting means which extends across the top of said platform, thence around the first end thereof and underneath said platform, thence around the end opposite from said first end thereof, thence to said beam, and thence to a terminal connection at said opposite end of said platform;
   shredding means including feeder arm means pivotally connected to said platform adjacent said first end for rotation on an axis parallel to said horizontal axis, and also including a shredding drum rotatably mounted at a distal end of said feeder arm means;
   actuating means adapted to position said pushing arm means and feeder arm means; and
   drive means operable to rotate said shredding drum.

2. A dispenser as defined in claim 1, wherein said pushing arm means and beam form a U-shaped structure, and said tension-transmitting means includes spaced parallel cables.

3. A dispenser as defined in claim 1, in combination with a freight trailer having tongue means, said platform being supported at least in part by said tongue means.

4. A combination as defined in claim 3, wherein said freight trailer includes means for moving a bale from said trailer to said platform.

5. A bale-handling and feed-dispensing system including a trailer having a frame provided with wheel means, tongue means, and a load-carrying platform, wherein the improvement comprises:
   a plurality of selectively engageable pivot means disposed on spaced horizontal axes and providing a pivotal support for said platform on said frame;
   actuating means disposed between the axes of certain of said pivot means, and adapted to rotate said platform selectively toward the front or the rear of said trailer depending on the selection of said pivot means, one of said pivot means axes being adjacent the opposite end of said frame from said tongue means, and said platform having a portion extending beyond said frame approximately the distance from said one axis to ground level established by said wheel means, said platform having thin insert means extending perpendicular to said platform at the end of said extending portion;
   grasping means mounted on said platform adjacent the tongue end of said trailer, said grasping means being adapted to engage the transversely opposite ends of a bale; and
   feeding means securable with respect to said frame, and having a bale-receiving platform disposed to receive a bale from said load-carrying platform, said feeding means also including bale-pushing means and shredding means, said shredding means being disposed to operate on material moved into shredding position by said pushing means.

6. A system as defined in claim 5, additionally including demountable loading means mounted at least adjacent said load-carrying platform at the tongue end of said trailer, and adapted to engage objects at ground level and raise said objects into coplanar relationship with said load-carrying platform.

7. A system as defined in claim 6, wherein said grasping means includes members pivotally mounted at opposite sides of the tongue end of said platform on front-rear axes of rotation, and adapted to engage said opposite bale ends at positions beyond the end of said load-carrying platform.

8. A system as defined in claim 7, wherein said loading means is adapted to place a bale in a position for engagement with said grasping means.

9. Large hay bale handling apparatus comprising:
   a wheeled trailer adapted to be towed behind a tractor, the trailer comprising a frame mounted on wheels and tongue means for attaching the trailer to the tractor, the trailer having an offset position wherein the trailer frame is positioned to one side of the tractor as the tractor moves along a path in a forward direction, the frame having a front facing in the direction of forward movement of the tractor and a rear facing in the opposite direction;
   a generally flat load platform pivotally mounted on the frame about a pivot axis adjacent the rear of the frame, the platform being pivotal in a rearward direction with respect to the direction of forward tractor movement between a lowered position, wherein the platform is inclined downwardly toward the rear of the frame, and a raised position, wherein the platform is in a generally vertical position at the rear of the frame, the load platform having a rear end that abuts the ground at the rear of the frame when the load platform pivots to its vertical position, the load platform including retainer means at the rear end thereof for preventing the large bales from sliding off the rear end of the platform;
   drive means for moving the load platform between its lowered and raised positions;
   a bale pick-up mechanism pivotally mounted to the load platform at a front end thereof, the pick-up mechanism comprising loading arm means pivotally mounted at an upper end thereof to the load platform and having a distal end that abuts the ground when the loading arm means is pivoted downwardly to a lowered position, the loading arm means being pivotable from its lowered position to a raised position, wherein the loading arm means is inclined downwardly toward the rear of the platform, loading fork means extending outwardly from the distal end of the loading arm means such that the fork means extends forwardly from the loading arm means when the loading arm means is in its lowered position, the loading fork means fitting under a large bale of hay when the loading arm means is in its lowered position, the loading fork means retaining the bale from sliding off the front end of the loading arm means as the loading arm means is thereafter pivoted to its raised position, the inclination of the platform in its lowered position and the inclination of the loading arm means in its raised position being such that bales picked up by the loading arm means slide rearwardly under the influence of gravity from the loading arm means to the rearmost available storage location on the platform when the platform is not already full, the loading arm means then being returnable to its lowered position to pick up another bale, the loading arm means being tiltable rearwardly to a vertical position along with the platform to reorient the horizontally positioned row of bales on the platform to a stacked vertical position on the ground at the rear of the apparatus; and drive means for moving the loading arm means between its lowered and raised positions.

10. Large bale handling apparatus according to claim 9 wherein the inclination of the loading arm means in its raised position is steeper than the inclination of the load platform, such that bales are induced by gravity to commence sliding rearwardly to the rear end of the load platform.

11. Large bale handling apparatus according to claim 9 wherein the load platform supports a plurality of bales in a row between the rear and front ends of the load platform, and the pick-up mechanism holds one additional bale and positions the bale in the same row when the lifting arm means is moved to its raised position, the subsequent pivotal movement of the load platform to its raised position placing the bales in a stack that includes the extra bale on the pick-up mechanism.

12. Large bale handling apparatus according to claim 11 wherein the distance between the fork means and the retainer means is such that the bales fit snugly between the retainer means and fork means when the platform and pick-up mechanism are fully loaded, the fork means and retainer means holding the bales in a stack as the platform is raised to its raised position.

13. Large bale handling apparatus according to claim 12 wherein the fork means is pivotally mounted on the loading arm means and can be pivoted away from the retainer means to release the stack of bales from the apparatus after the load platform has been moved to its raised position.

14. Large bale handling apparatus according to claim 12 wherein the length of the load platform is such that three large rectangular bales fit on the platform while a fourth bale is supported by the pick-up mechanism, the height of the loading arm means being about the height of a bale.

15. Large bale handling apparatus according to claim 9, wherein the loading fork means are pivotally mounted to the loading arm means for movement in a vertical plane, the fork means being movable to a position where a distal end of the fork means is positioned adjacent the ground so as to be insertable easily under an approaching bale, while the loading arm means can remain slightly inclined rearwardly to restrain a bale from falling forwardly off the fork means, the fork means being pivotal rearwardly so as to be able to clamp bales between the fork means and retainer means when the loading arm means is raised and the platform and loading arm means are fully loaded, the fork means being pivotal forwardly to release clamped bales, permitting removal of the apparatus from the bales when they are positioned on the ground in a stacked position.

16. Large bale handling apparatus according to claim 9, wherein the bale pick up mechanism is removable from the load platform and the apparatus further comprises a transverse bale feeder and shredder that is mounted on the frame at the forward end of the platform, the feeder and shredder conveying bales that are deposited therein in a sideways direction and shredding or flaking the bales at the side of the apparatus so as to deposit shredded or flaked feed on the ground at the side of the apparatus.

17. Large bale handling apparatus according to claim 16, wherein the platform is tiltable forwardly such that bales positioned on the platform are induced by gravity to slide into the feeder and shredder.

18. Large bale handling apparatus according to claim 17, wherein the apparatus includes bale gripping means attachable to the sides of the platform, the gripping means being closeable to grip stacked bales positioned adjacent the platform such that the stacked bales will be tipped over onto the platform as the platform is pivoted forwardly from its rearwardly vertical position, the gripping means being openable to permit the bales to slide forwardly on the platform into the bale feeder and shredder when the platform is inclined forwardly and downwardly.

19. Large bale handling apparatus according to claim 18, wherein the gripping means grips and holds the top bale in a stack created by the apparatus in its loading and stacking mode, the gripping means holding the top bale on the stack even though no support is provided by the lifting structure, said lifting structure having been removed in favor of the feeding and shredding mechanism.

20. Large bale handling apparatus according to claim 17 wherein the load platform also is pivotal with respect to the frame about a second pivot axis positioned forward of the other pivot axis toward the front end of the load platform, the load platform being tiltable forwardly about the second pivot axis to an inclination at which the bales slide off the front end of the load platform under the influence of gravity.

21. Large bale handling apparatus according to claim 16, wherein the feeder comprises a transverse feeder channel in which bales are positioned for feeding, the shredder being mounted at an outer end of the channel, the feeder further including a flexible belt having one end mounted adjacent an opposite end of the channel, the belt extending from the outer end of the channel to the opposite end of the channel, said one end of the belt being attached to a transversely movable member, such that the belt fits around and engages a bale resting in the channel and moves the bale toward the outer end of the channel as the transversely movable member is moved by a drive means toward the outer end of the channel.

22. Large bale handling apparatus according to claim 21, wherein the transversely movable member comprises a horizontal beam mounted above the channel between outer ends of a pair of parallel, spaced arms, the arms being pivotally mounted at inner ends to the frame at a position adjacent the outer end of the channel, the bale being moved outwardly by pivotal movement of the arms such that the beam moves in an outward direction.

23. Apparatus according to claim 21, wherein said one end of the belt is fixed to the movable member, an opposite end of the belt is connected to the outer end of the channel by a variable length cable connection wherein the length of the cable connection between the opposite end of the belt and the outer end of the channel is responsive to the position of the movable member, the cable connection becoming shorter and drawing said outer end of the flexible belt closer to the outer end of the channel as the movable member is moved toward the opposite end of the channel, thereby reducing slack in the belt.

* * * * *